United States Patent [19]

Shibahara et al.

[11] Patent Number: 5,246,994
[45] Date of Patent: Sep. 21, 1993

[54] RUBBER COMPOSITION CONTAINING A NITRILE-CONJUGATED DIENE COPOLYMER

[75] Inventors: Akihiro Shibahara, Komaki; Takao Sugiura, Matsuzaka; Tetsuo Ohyama, Kamakura; Yasunori Iwasaki, Yokohama, all of Japan

[73] Assignees: Tokai Rubber Industries, Ltd.; Nippon Zeon Co., Ltd., Japan

[21] Appl. No.: 953,958

[22] Filed: Oct. 1, 1992

[30] Foreign Application Priority Data

Oct. 4, 1991 [JP] Japan .................. 3-285691

[51] Int. Cl.$^5$ .................. C08K 5/20; C08L 7/00
[52] U.S. Cl. .................. 524/232; 524/230; 524/210; 524/574; 524/575.5
[58] Field of Search .............. 524/232, 210, 230, 574, 524/575.5

[56] References Cited

U.S. PATENT DOCUMENTS 4,500,666 2/1985 Wada .................. 524/232

FOREIGN PATENT DOCUMENTS 1-306440 12/1989 Japan .

Primary Examiner—Joseph L. Schofer
Assistant Examiner—Jeffrey T. Smith
Attorney, Agent, or Firm—Parkhurst, Wendel & Rossi

[57] ABSTRACT

A rubber composition containing (A) a mixture obtained by mixing (a1) 100 parts by weight of a highly saturated, ethylenically unsaturated nitrile-conjugated diene copolymer rubber whose copolymer chain contains not more than 30% by weight of conjugated diene units, and (a2) from 10 to 100 parts by weight of an ethylenically unsaturated monomer containing at least one carboxyl group, at least a proportion of the at least one carboxyl group being metal substituted such that a molar ratio of the at least one carboxyl group to the metal falls within a range of from 1/0.5 to ½; (B) an organic peroxide; and (C) a fatty acid amide, from 0.2 to 15 parts by weight of the (B) organic peroxide and from 0.5 to 20 parts by weight of the (C) fatty acid amide being added to 100 parts by weight of the (A) mixture.

19 Claims, No Drawings

RUBBER COMPOSITION CONTAINING A NITRILE-CONJUGATED DIENE COPOLYMER

BACKGROUND OF THE INVENTION

1. Field of the Invention

The present invention generally relates to a rubber composition and particularly to such a composition which provides a rubber having high hardness, set resistance and hydrolysis resistance.

2. Related Art Statement

A rubber used for producing various sorts of vibration isolators and a stabilizer bushing for an automotive vehicle, is required to possess (i) high hardness, (ii) appropriate rubber elasticity and accordingly suitable set resistance, (iii) good weather resistance, and additionally (iv) excellent slide characteristic.

For obtaining a rubber having a sufficiently high degree of hardness, in particular, it is generally preferred to select urethane rubber. However, urethane rubber suffers from low hydrolysis resistance and therefore insufficiently low weather resistance. There have been some proposals to provide a high-hardness polymer rubber free from the problem of low hydrolysis resistance. For example, unexamined Japanese Patent Application laid open under Publication No. 1(1989)-306440 discloses a high-strength rubber obtained by mixing zinc methacrylate with a rubber material and crosslinking the mixture with an organic peroxide. However, even this rubber does not have appropriate slide characteristic.

Meanwhile, for obtaining a rubber having excellent slide characteristic, it is preferred to select a self-lubricating rubber containing silicone oil. However, such a self-lubricating rubber suffers from low hardness. Self-lubricating thermoplastic urethane rubber lacks appropriate set resistance and hydrolysis resistance, and self-lubricating thermosetting urethane rubber lacks appropriate hydrolysis resistance.

Thus, there is known no rubber that satisfies the requirements to hardness, set resistance, hydrolysis resistance, and slide characteristic.

SUMMARY OF THE INVENTION

It is an object of the present invention to provide a rubber composition which provides a rubber having excellent slide characteristic in addition to high hardness, set resistance and hydrolysis resistance.

The above object has been achieved by the present invention, which provides a rubber composition comprising (A) a mixture obtained by mixing (a1) 100 parts by weight of a highly saturated, ethylenically unsaturated nitrile-conjugated diene copolymer rubber whose copolymer chain contains not more than 30% by weight of conjugated diene units, and (a2) from 10 to 100 parts by weight of an ethylenically unsaturated monomer containing at least one carboxyl group, at least a proportion of the at least one carboxyl group being metal substituted such that a molar ratio of the at least one carboxyl group to the metal falls within a range of from 1/0.5 to 1/1; (B) an organic peroxide; and (C) a fatty acid amide, wherein from 0.2 to 15 parts by weight of the (B) organic peroxide and from 0.5 to 20 parts by weight of the (C) fatty acid amide are added to 100 parts by weight of the (A) mixture.

In the rubber composition in accordance with the present invention, the constituents (a1) and (a2) are crosslinked with the constituent (B) to produce a polymer rubber. The rubber obtained from the rubber composition enjoys high hardness, set resistance and hydrolysis resistance owing to the properties of the polymer product. Additionally, the fatty acid amide as the constituent (C) is dispersed throughout the polymer product. Therefore the polymer product (rubber) also enjoys excellent slide characteristic. Thus, the present rubber composition is free from the problems with the conventional high-hardness rubbers and self-lubricating rubbers, and accordingly is very useful in the field of the art.

DETAILED DESCRIPTION OF THE INVENTION

According to the present invention, it is preferred to use, as (a1) the highly saturated, ethylenically unsaturated nitrile-conjugated diene copolymer rubber, a copolymer obtained by copolymerizing two sorts of monomers, that is, (1) an ethylenically unsaturated nitrile such as acrylonitrile and methacrylonitrile, and (2) a conjugated diene such as 1,3-butadiene, isoprene, and 1,3-pentadiene. Alternatively, it is possible to use as the constituent (a1) a polymonomeric copolymer obtained by copolymerizing the above-indicated two sorts of monomers (1), (2) and one or more additional monomers copolymerizable with those monomers; such as vinyl aromatic compound, acrylic acid, methacrylic acid, alkyl acrylate, alkyl methacrylate, alkoxyalkyl acrylate, alkoxyalkyl methacrylate, cyanoalkyl acrylate, and cyanoalkyl methacrylate.

More specifically described, preferable concrete examples of (a1) the copolymer rubber are as follows: acrylonitrile-butadiene copolymer rubber (NBR), acrylonitrile-isoprene copolymer rubber, acrylonitrile-butadiene-isoprene copolymer rubber, acrylonitrile-butadiene-acrylate copolymer rubber, and acrylonitrile-butadiene-acrylate-methacrylic acid copolymer rubber. In the event that the copolymer chain of the rubber (a1) contains more than 30% by weight of the conjugated diene units, the copolymer is subjected to hydrogenation so as to obtain a highly saturated copolymer rubber whose copolymer chain contains not more than 30% by weight of the conjugated diene units. Thus, the properties of the rubber product are extremely improved.

As (a2) the ethylenically unsaturated monomer containing at least one carboxyl group, it is preferred to use a metal salt of at least one of an unsaturated monocarboxylic acid such as acrylic acid, methacrylic acid, crotonic acid, and 3-butenoic acid; an unsaturated dicarboxylic acid such as maleic acid, fumaric acid, and itaconic acid; a monoester of an unsaturated dicarboxylic acid, such as monomethyl maleate, monoethyl maleate, and monoethyl itaconate; an unsaturated polycarboxylic acid different from the above-indicated unsaturated dicarboxylic acids; and an ester of an unsaturated polycarboxylic acid different from the above-indicated unsaturated dicarboxylic acids, the ester having at least one "free" (non-esterified) carboxyl group. Any metal which provides a salt by reaction with any of the above-indicated carboxylic acids and their esters, may be used. It is preferred to use zinc, magnesium, calcium, or aluminum. Zinc salt of methacrylic acid (zinc methacrylate) is most preferably used as the constituent (a2).

According to the present invention, at least a proportion of the carboxyl group or groups contained in the constituent (a2) is metal substituted. Therefore, some proportion of the constituent (a2) may be a monomer which is not metal substituted. For improving the properties of the polymer product, it is necessary to use the constituent (a2) wherein the molar ratio of the carboxyl group or groups to the metal falls within the range of from 1/0.5 to $\frac{1}{3}$. In addition, it is preferred to use the constituent (a2) whose particle diameters are not more than 20 μm.

According to the present invention, from 10 to 100 parts by weight, more preferably from 20 to 80 parts by weight, of the constituent (a2) is mixed with 100 parts by weight of the constituent (a1) to provide the mixture (A). As the proportion of the constituent (a2) relative to that of the constituent (a1) is increased, the polymer product (rubber) has higher hardness and lower set resistance. Therefore, the respective proportions of the constituents (a1), (a2) are determined depending upon the balance between desired hardness and set resistance. Although the constituent (a2) in the form of a salt of an ethylenically unsaturated carboxylic acid, may be added to the rubber composition, it is possible to react, in the rubber composition, any of the above-indicated ethylenically unsaturated carboxylic acids, with the oxide, hydroxide, or carbonate of any of the above-indicated metals, and to thereby provide the rubber composition containing the constituent (a2).

According to the present invention, an organic peroxide which is commonly used for crosslinking a rubber composition, is added as the constituent (B) to the mixture (A) of the constituents (a1) and (a2). Preferable examples of the constituent (B) are as follows: dicumyl peroxide, di-t-butyl peroxide, t-butylcumyl peroxide, benzoyl peroxide, 2,5-dimethyl-2,5-di(t-butylperoxy) hexine-3, 2,5-dimethyl-2,5-di(benzoylperoxy) hexane, 2,5-dimethyl-2,5-di(t-butylperoxy)-hexane, and 1,3-di(t-butylperoxyisopropyl) benzene. These organic peroxides may be used alone or in combination. From 0.2 to 15 parts by weight, more preferably from 1 to 10 parts by weight, of the constituent (B) is added to 100 parts by weight of the mixture (A).

In the present invention, the fatty acid amide as the constituent (C) is added to the mixture (A) of the constituents (a1) and (a2), to give excellent slide characteristic to the polymer product. As the constituent (C), it is preferred to use an amide of an aliphatic monocarboxylic acid whose molecule has from 12 to 22 carbon atoms; such as oleic acid amide, erucic amide, lauric acid amide, and stearic acid amide. From 0.5 to 20 parts by weight, more preferably from 2 to 15 parts by weight, of the constituent (C) is added to 100 parts by weight of the mixture (A). If the proportion of the constituent (C) is lower than the lower limit, 0.5 parts by weight, the polymer product (rubber) does not have sufficiently high slide characteristic. Meanwhile, if the proportion of the constituent (C) exceeds the upper limit, 20 parts by weight, the polymer product suffers from low set resistance and hardness and insufficiently low kneadability.

According to the present invention, the rubber composition may include, in addition to the above-described essential constituents (a1), (a2), (B), (C), at least one of a commonly used reinforcing agent such as carbon black and silica; a known filler such as calcium carbonate and talc; a known crosslinking aid such as triallyl isocyanate, trimethylolpropane triacrylate, and m-phenylenebismaleimide; a plasticizer; a stabilizer; a processing aid; a coloring agent; other additives; and other compounding agents.

The respective constituents of the rubber composition are mixed with each other in any of commonly known manners.

EXAMPLES

Hereinafter, there will be described some typical examples of the rubber composition in accordance with the present invention. However, it is to be understood that the present invention by no means is limited to those examples.

Invention Examples 1 and 2 are prepared by adding (C) 3 or 5 parts by weight of oleic acid amide (product name: ARMOSLIP CP-P available from LION AKZO CO., LTD.), respectively, to a basic rubber composition consisting of (a1) 80 parts by weight of hydrogenated NBR (acrylonitrile-butadiene copolymer rubber) whose copolymer chain contains not more than 30% by weight of the conjugated butadiene units (product name: ZETPOL 2020 available from NIPPON ZEON CO., LTD.), (a2) 20 parts by weight of zinc methacrylate, and (B) 5 parts by weight of organic peroxide (product name: PEROXYMON F40 available from NIPPON OILS & FATS CO., LTD.).

The basic rubber composition is used as Comparative Example 1.

Comparative Example 2 is a self-lubricating, high-hardness rubber composition consisting of 60 parts by weight of NR (natural rubber), 40 parts by weight of BR (butadiene copolymer rubber), 20 parts by weight of high-styrene SBR (styrene-butadiene copolymer rubber), 5 parts by weight of zinc oxide (ZnO), 1 part by weight of antioxidant, 80 parts by weight of carbon black, 5 parts by weight of oil, and 4 parts by weight of sulfur.

Comparative Example 3 is a self-lubricating, thermosetting urethane rubber composition consisting of 100 parts by weight of ether-type urethane rubber material (tolylene diisocyanate used as the isocyanate component, and polytetramethylene glycol used as the polyol component), 17 parts by weight of curing agent, and 3 parts by weight of silicone oil.

Comparative Example 4 is a self-lubricating, thermoplastic urethane rubber composition consisting of 100 parts by weight of ester-type urethane rubber material (diphenylmethane diisocyanate used as the isocyanate component, and caprolactone used as the polyol component), 10 parts by weight of polytetrafluoroethylene, and 1 part by weight of silicone oil.

Test pieces are produced from the rubber compositions of Invention Examples 1, 2 and Comparative Examples 1, 2, 3, 4, and are tested as described in Japanese Industrial Standard (JIS) K-6301 with respect to initial properties and compression permanent set. Other properties are tested as described below.

The test results are shown in Table I.

Repeated Compression Test ("Dynamic Fatigue" Test)

With respect to each example, a test piece of 8 mm thickness, 40 mm length and 25 mm width, sandwiched between a pair of jigs, is subjected to the repeated compression of ±5 mm/min×5 cycles under the load which is changed from 0 ton to 1 ton and then from 1 ton to 0 ton in each cycle. Dynamic fatigue (%) is calculated by the following formula:

Dynamic Fatigue $(\%) = [(H_o \times H)/h] \times 100$ wherein $H_0$; initial thickness of the test piece, H; thickness after the repeated compression (five cycles); and h; compression amount.

Static Spring Characteristic Test

With respect to each example, a test piece of 8 mm thickness, 40 mm length and 25 mm width is subjected to the load applied at 20 mm/min in the direction of thickness of the test piece, so as to obtain a load-deflection curve. The static spring characteristics, $K_S$, are calculated based on the applied loads corresponding to the test-piece deflection ranges of 0.2 to 0.5 mm and 0.5 to 1.0 mm, respectively.

Constant Deflection Test

With respect to each example, a jig is sandwiched between a pair of test pieces each of 8 mm thickness, 40 mm length and 25 mm width, and the test pieces and jig are compressed. A load which is necessary to compress each of the test pieces by 10%, is measured as the "constant deflection" load.

Constant-Deflection Load Test ("Drawing Force" Test)

With the test pieces each being compressed by 10% in the above-indicated Constant Deflection Test, a force which is necessary to draw out the sandwiched jig at 50 mm/min, is measured as the drawing force.

Deflection Load Test

With respect to each example, a load which is necessary to compress by 10% each test piece is measured as the "deflection" load by using a load cell.

DIN Wear Test (DIN: German Industrial Standard)

While a test piece of 8 mm thickness and 16 mm diameter is pressed under a predetermined load against a rotating drum covered with a sand paper, the test piece is reciprocated in the axial direction of the drum, until the total distance of displacement of the test piece amounts to 40 m. At that time, the wear amount (cc) of the test piece is measured. The drum used has a 550 mm length and a 150 mm diameter, and is rotated at 40 rpm.

Hydrolysis Resistance Test

A test piece is subjected to 80° C. heated water for 5000 hours, and subsequently the tensile strength ($T_B$) of the test piece is measured. The symbol, O, used in Table I means that the test piece showed a sufficient tensile strength higher than a predetermined level, while the symbol, X, means that the test piece showed an insufficient tensile strength not higher than the predetermined level.

TABLE I

|  | INVENTION EXAMPLES | | COMPARATIVE EXAMPLES | | | |
|---|---|---|---|---|---|---|
|  | 1 | 2 | 1 | 2 | 3 | 4 |
| INITIAL PROPERTIES |  |  |  |  |  |  |
| 50% MODULUS (kgf/cm²) | — | — | — | — | 106 | 73 |
| 100% MODULUS (kgf/cm²) | 163 | 115 | 201 | 57 | 134 | 80 |
| TENSILE STRENGTH $T_B$ (kgf/cm²) | 353 | 446 | 355 | 194 | 327 | 274 |
| ELONGATION $E_B$ (%) | 360 | 390 | 310 | 340 | 300 | 570 |
| HARDNESS $H_S$ (JIS A) | 88 | 88 | 88 | 78 | 92 | 91 |
| COMPRESSION PERMANENT SET |  |  |  |  |  |  |
| 70° c. × 22 Hr (%) | 30 | 32 | 29 | 23 | 27 | 55 |
| *RT × 72 Hr (%) | 19 | 22 | 19 | 15 | 15 | 31 |
| RT × 140 Hr (%) | 23 | 26 | 22 | 18 | 18 | 36 |
| RT × 240 Hr (%) | 26 | 27 | 23 | 20 | 20 | 39 |
| DYNAMIC FATIGUE (%) | 8 | 10 | 8 | 8 | 7 | 12 |
| STATIC SPRING CHARACTERISTICS |  |  |  |  |  |  |
| 0.2–0.5 mm (kgf/mm) | 467 | 356 | 500 | 211 | 789 | 445 |
| 0.5–1.0 mm (kgf/mm) | 373 | 333 | 507 | 180 | 613 | 560 |
| SLIDE CHARACTERISTICS |  |  |  |  |  |  |
| **C.D.L. (kg) | 149 | 143 | 783 | 390 | 413 | 527 |
| DRAWING FORCE (kg) | 180 | 200 | 915 | 335 | 250 | 275 |
| ***D.L. (kg) | 220 | 275 | 300 | 130 | 550 | 350 |
| FRICTION FACTOR | 0.68 | 0.52 | 2.6 | 3.0 | 0.75 | 1.5 |
| DIN WEAR (cc) | 0.132 | 0.094 | 0.110 | 0.139 | 0.059 | 0.044 |
| HYDROLYSIS RESISTANCE | o | o | o | o | X | X |

*RT: Room Temperature
**C.D.L.: Constant Deflection Load
***D.L.: Deflection Load The test results of Table I indicate that Comparative Example 1 exhibits an extremely great drawing force and therefore suffers from insufficiently low slide characteristics. Comparative Example 2 exhibits low moduli and low static spring characteristics and therefore suffers from insufficiently low hardness. Comparative Examples 3 and 4 suffers from low hydrolysis resistance and therefore insufficient weather resistance.

On the other hand, Invention Examples 1 and 2 exhibit good results with respect to all the properties listed in Table I. More specifically described, the results with respect to the moduli and the static spring characteristics indicate that Invention Examples 1, 2 exhibit about 2.5 times the hardness of the conventional self-lubricating high-hardness rubber (Comparative Example 2). In addition, the results with respect to the friction factor indicate that Invention Examples 1, 2 exhibit about one third to one half of the friction factor of the self-lubricating thermoplastic urethane rubber (Comparative Example 4). This means that Invention Examples 1, 2 each provide a rubber having excellent slide characteristics. Invention Examples 1 and 2 shows about two thirds of the results of Comparative Example 4 with respect to the compression permanent set and the repeated compression set (dynamic fatigue). This means that Invention Examples 1 and 2 provide a rubber having high set resistance. Furthermore, Invention Examples 1 and 2 each provide a rubber with no possibility of hydrolysis because of the polymer structure thereof, and therefore the rubbers enjoy higher weather resistance than those of the conventional urethane rubbers (Comparative Examples 3, 4).

While the present invention has been described with the particular examples thereof, it is to be understood that the present invention may be embodied with various changes, improvements and modifications that may occur to those skilled in the art without departing from the scope and spirit of the invention defined in the appended claims.

What is claimed is:

1. A rubber composition comprising:
    (A) a mixture obtained by mixing (a1) 100 parts by weight of a highly saturated, ethylenically unsaturated nitrile-conjugated diene copolymer rubber whose copolymer chain contains not more than 30% by weight of conjugated diene units, and (a2) from 10 to 100 parts by weight of an ethylenically unsaturated monomer containing at least one carboxyl group, at least a proportion of said at least one carboxyl group being metal substituted such that a molar ratio of said at least one carboxyl group to said metal falls within a range of from 1/0.5 to ⅓;
    (B) an organic peroxide; and
    (C) a fatty acid amide,
    wherein from 0.2 to 15 parts by weight of said (B) organic peroxide and from 0.5 to 20 parts by weight of said (C) fatty acid amide are added to 100 parts by weight of said (A) mixture.

2. A rubber composition according to claim 1, wherein from 2 to 15 parts by weight of said (C) fatty acid amide is added to 100 parts by weight of said (A) mixture and 0.2 to 15 parts by weight of said (B) organic peroxide.

3. A rubber composition according to claim 1, wherein said (C) fatty acid amide is an amide of an aliphatic monocarboxylic acid whose molecule has from 12 to 22 carbon atoms.

4. A rubber composition according to claim 3, wherein said (C) fatty acid amide is selected from the group consisting of oleic acid amide, erucic amide, lauric acid amide, and stearic acid amide.

5. A rubber composition according to claim 1, wherein said (a1) highly saturated, ethylenically unsaturated nitrile-conjugated diene copolymer rubber is a copolymer obtained by copolymerizing an ethylenically unsaturated nitrile and a conjugated diene.

6. A rubber composition according to claim 5, wherein said ethylenically unsaturated nitrile is selected from the group consisting of acrylonitrile and methacrylonitrile.

7. A rubber composition according to claim 5, wherein said conjugated diene is selected from the group consisting of 1,3-butadiene, isoprene, and 1,3-pentadiene.

8. A rubber composition according to claim 1, wherein said (a1) highly saturated, ethylenically unsaturated nitrile-conjugated diene copolymer rubber is a copolymer obtained by copolymerizing an ethylenically unsaturated nitrile, a conjugated diene, and one or more monomers copolymerizable with said ethylenically unsaturated nitrile and said conjugated diene.

9. A rubber composition according to claim 8, wherein said one or more monomers copolymerizable with said ethylenically unsaturated nitrile and said conjugated diene is/are selected from the group consisting of vinyl aromatic compound, acrylic acid, methacrylic acid, alkyl acrylate, alkyl methacrylate, alkoxyalkyl acrylate, alkoxyalkyl methacrylate, cyanoalkyl acrylate, and cyanoalkyl methacrylate.

10. A rubber composition according to claim 1, wherein said (a1) highly saturated, ethylenically unsaturated nitrile-conjugated diene copolymer rubber is selected from the group consisting of acrylonitrile-butadiene copolymer rubber, acrylonitrile-isoprene copolymer rubber, acrylonitrile-butadiene-isoprene copolymer rubber, acrylonitrile-butadiene-acrylate copolymer rubber, and acrylonitrile-butadiene-acrylate-methacrylic acid copolymer rubber.

11. A rubber composition according to claim 1, wherein said (a1) highly saturated, ethylenically unsaturated nitrile-conjugated diene copolymer rubber is obtained by hydrogenation of an ethylenically unsaturated nitrile-conjugated diene copolymer rubber containing more than 30% by weight of conjugated diene units.

12. A rubber composition according to claim 1, wherein from 20 to 80 parts by weight of said (a2) ethylenically unsaturated monomer is added to 100 parts by weight of said (a1) highly saturated, ethylenically unsaturated nitrile-conjugated diene copolymer rubber, so as to provide said mixture (A).

13. A rubber composition according to claim 1, wherein said (a2) ethylenically unsaturated monomer to be metal substituted is selected from the group consisting of an unsaturated monocarboxylic acid such as acrylic acid, methacrylic acid, crotonic acid, and 3-butenoic acid; an unsaturated dicarboxylic acid such as maleic acid, fumaric acid, and itaconic acid; a monoester of an unsaturated dicarboxylic acid, such as monomethyl maleate, monoethyl maleate, and monoethyl itaconate; an unsaturated polycarboxylic acid different from said unsaturated dicarboxylic acid; and an ester of an unsaturated polycarboxylic acid different from said unsaturated dicarboxylic acid, said ester having at least one free carboxyl group.

14. A rubber composition according to claim 1, wherein said metal for substitution of said (a2) ethylenically unsaturated monomer is selected from the group consisting of zinc, magnesium, calcium, and aluminum.

15. A rubber composition according to claim 1, wherein said (a2) metal substituted ethylenically unsaturated monomer is zinc methacrylate.

16. A rubber composition according to claim 1, wherein said (a2) ethylenically unsaturated monomer has a particle diameter of not more than 20 μm.

17. A rubber composition according to claim 1, wherein 1 to 10 parts by weight of said (B) organic peroxide is added to 100 parts by weight of said (A) mixture and 0.5 to 20 parts by weight of said (C) fatty acid amide.

18. A rubber composition according to claim 1, wherein said (B) organic peroxide is selected from the group consisting of dicumyl peroxide, di-t-butyl peroxide, t-butylcumyl peroxide, benzoyl peroxide, 2,5-dimethyl-2,5-di(t-butylperoxy) hexine-3, 2,5-dimethyl-2,5-di(benzoylperoxy) hexane, 2,5-dimethyl-2,5-di(t-butylperoxy)-hexane, and 1,3-di(t-butylperoxyisopropyl) benzene.

19. A rubber composition according to claim 1, further comprising at least one of a reinforcing agent such as carbon black and silica; a filler selected from the group consisting of calcium carbonate and talc; a crosslinking aid selected from the group consisting of as triallyl isocyanate, trimethylolpropane triacrylate, and m-phenylenebismaleimide; a plasticizer; a stabilizer; a processing aid; and a coloring agent.

* * * * *